United States Patent [19]
Yeh

[11] Patent Number: 5,489,674
[45] Date of Patent: Feb. 6, 1996

[54] GUAR GUM COMPOSITION AND PROCESS FOR MAKING IT

[75] Inventor: Michael H. Yeh, Hamilton, N.J.

[73] Assignee: Rhone-Poulenc Inc., Princeton, N.J.

[21] Appl. No.: 257,609

[22] Filed: Jun. 9, 1994

[51] Int. Cl.⁶ .......................... C08B 37/00; C09K 7/00; C07H 1/00
[52] U.S. Cl. ........................... 356/114; 536/124; 536/127
[58] Field of Search ................................. 536/114, 127, 536/124

[56] References Cited

U.S. PATENT DOCUMENTS

| | | | |
|---|---|---|---|
| 3,912,713 | 10/1975 | Boonstra et al. | 260/209 |
| 4,031,306 | 6/1977 | DeMartino et al. | 536/114 |
| 4,057,509 | 11/1977 | Costanza et al. | 252/316 |
| 4,169,945 | 10/1979 | Deguia et al. | 536/114 |
| 4,299,825 | 11/1981 | Lee | 424/180 |
| 4,320,226 | 3/1982 | Tiefenthaler et al. | 536/114 |
| 4,659,811 | 4/1987 | Wu | 536/114 |
| 4,693,982 | 9/1987 | Carter et al. | 435/272 |
| 4,874,854 | 10/1989 | Colegrove et al. | 536/114 |
| 4,959,464 | 9/1990 | Yeh | 536/114 |

FOREIGN PATENT DOCUMENTS 0401668  12/1990  European Pat. Off. .

*Primary Examiner*—Ronald W. Griffin
*Attorney, Agent, or Firm*—Andrew M. Solomon

[57] ABSTRACT

Guar gum which demonstrates greater than 75% light transmission at a wavelength of from about 500–600 nanometers when dispersed in water in the amount of 0.5 parts per 100 parts water and the process for producing such guar gum is disclosed.

13 Claims, No Drawings

GUAR GUM COMPOSITION AND PROCESS FOR MAKING IT

BACKGROUND OF THE INVENTION

1. Field of the Invention

The present invention relates to polygalactomannan compositions and more particularly guar gum compositions which, when dispersed in water, are capable of forming a relatively transparent solution. The compositions are particularly useful for applications where clarity and purity of aqueous solutions are desirable such as oil recovery, personal care products, textile chemicals, paper chemicals, paints, and the like.

2. Technology Description

Natural and synthetic polymers containing hydroxy groups have been used as thickeners for foods, coatings, paints, explosive slurries, oil well fluids, cosmetics and other personal care products, and many other functional applications.

One class of polymers that have been widely used as suspending and viscosity agents are polygalactomannans. Polygalactomannans are polysaccharides composed principally of galactose and mannose units and are usually found in the endosperm of leguminous seeds such as guar, locust bean, honey locust, flame tree, and the like. The polygalactomannans may be used in either their natural form or may be substituted with one or more functional groups (e.g., carboxymethyl group). The most commonly used polygalactomannan is guar gum. In practice, to thicken a fluid the polygalactomannans may either be added by themselves, or with other viscosity modifiers such as other polysaccharides, xanthan gum and the like.

While the use of polygalactomannans, and guar gum in particular, as thickening agents has been met with great success, it is still desired to improve the physical properties of the guar gum when dispersed in a solution such as water. One such property is its ability to transmit light when used as an aqueous solution. Aqueous solutions of guar gum tend to be opaque or translucent at best. It is particularly desired that clear, colorless and less impure solutions be produced when dispersing guar gum in water as it makes the final solution more useful for the above-described applications. It is believed that the presence of insolubles is largely responsible for the inability to obtain clear solutions.

U.S. Pat. No. 4,693,982 discloses the use of enzymes to reduce insolubles in guar gum. The level of clarity produced by the enzymatic treatment is not disclosed in the patent.

U.S. Pat. No. 4,874,854 discloses low viscosity heteropolysaccharides, for example, guar gum. Example 3 discloses a "clarified" guar gum which is produced by cold filtration of a 0.3% solution through diatomaceous earth and precipitated with isopropyl alcohol. The ability of this material to transmit light is not disclosed in the patent.

U.S. Pat. No. 3,912,713 discloses non-lumping derivatives of guar gum produced by derivatizing guar gum splits at a moisture content of 20–80% by weight, raising the moisture content of the splits, if necessary, to 30–80% by weight and fragmenting the splits by pressing them out in a thin layer and drying them on a cylinder heated to 100°–180° C. and comminuting the film to form particulates of a size in the order of +20 mesh, as measured by a Tyler screen, and preferably having a size of 2–5 mm. This process is commonly referred to as drum drying. According to Example 3, the product produced in the Example gives a "clear solution having no lumps or clots on stirring in water". No quantitative definition of "clear" (i.e. light transmittance) is presented in the patent.

U.S. Pat. No. 4,057,509 discloses polygalactomannan allyl ether gels. According to Example 1, guar gum is purified to yield a material having less than 0.1% nitrogen content and about 0.48% ash. The same purification method is described in U.S. Pat. No. 10 4,169,945.

U.S. Pat. No. 4,659,811 teaches the treatment of 100 parts of guar gum with at least 150 parts of an aqueous alkali solution whereby the water present in the entire solution exceeds 60%. No data regarding the ability of resulting aqueous solutions to transmit light is set forth.

Despite the above advances, it is believed that the above processes are able to produce guar gum which, when dissolved in solution at 0.5 weight percent, is able to only provide minimal light transparency, i.e., no more than 50–60% at 500–600 nm.

Accordingly, there exists a need in the art for a guar gum which is capable of producing nearly pure, clear and colorless solutions upon dispersing in water and a novel process for producing the gum.

BRIEF SUMMARY OF THE INVENTION

In accordance with the present invention, polygalactomannans which are capable of producing nearly pure, clear and colorless solutions upon dispersing in water and a novel process for producing them is provided.

One embodiment of the present invention comprises polygalactomannans which demonstrate greater than 75% light transmission at a wavelength of from about 500–600 nanometers when dispersed in water in the amount of 0.5 parts per 100 parts water.

In particularly preferred embodiments, the polygalactomannan produced is guar gum. In addition, the guar gum has a nitrogen content of less than 0.06%, is capable of demonstrating a constant solution viscosity for greater than seven days, and is either in its natural state or is derivatized.

Another embodiment of the present invention comprises an oil field chemical, personal care chemical, textile chemical, paper chemical or coating composition including guar gum capable of forming clear aqueous solutions, which, when dispersed in water in the amount of 0.5 parts per 100 parts water demonstrates greater than 75% light transmission at a wavelength of from about 500–600 nanometers.

A third embodiment of the present invention comprises a process for producing a polygalactomannan comprising the steps of:

(a) treating polygalctomannan splits with a 12 to 30 weight percent solution of a base;

(b) washing said base treated splits one or more times with water, an organic solvent or mixtures thereof; and (c) recovering the product produced thereby.

In preferred embodiments, the polygalactomannan splits comprise double or triple purified guar gum splits, the base selected is NaOH, between about 120 to about 140 parts of base solution are used to treat 100 parts of splits, and the starting materials may include a crosslinking agent. In addition the splits can be derivatized by means known in the art.

Accordingly, it is an object of the present invention to provide a polygalactomannan which easily transmits light when used in an aqueous solution, has a low amount of insolubles, demonstrates excellent crosslinking properties, and can maintain a constant solution viscosity for an extended period of time.

It is another object of the present invention to provide an oil field chemical, food product, personal care or cosmetic chemical, absorbent material, textile chemical, paper chemical or coating composition which includes the novel polygalactomannan.

A further object of the present invention is to provide a process for making the polygalactomannan.

An additional object of the present invention is to provide derivatized polygalactomannans which easily transmit light when used in an aqueous solution, have a low amount of insolubles, demonstrate excellent crosslinking properties, and can maintain a constant solution viscosity for an extended period of time.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention relates to novel polygalactomannans. Polygalactomannans are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-β-glycosidic linkage and the galactose branching takes place by means of a 1–6 linkage on alternate mannose units. The ratio of galactose to mannose in the guar polymer is, therefore, one to two.

Locust bean gum is also a polygalactomannan gum of similar molecular structure in which the ratio of galactose to mannose is one to four. Guar and locust bean gum are the preferred sources of the polygalactomannans, principally because of the commercial availability thereof. In the preferred embodiment, the invention is directed to the production of guar gum.

The guar endosperm as used in this invention is commonly referred to as "purified splits", "double purified splits" or "triple purified splits" depending upon the degree of purification. "Purified splits" are obtained by mechanical separation of the endosperm from the hull and germ of the guar seed in as pure and intact a form as possible with no other processing steps. These purified splits contain, as impurities, about 6–12 percent moisture, 4–7 percent protein and 7 percent acid insoluble residue. They have a particle size range of about 4 to about 20 mesh (U.S. Standard Sieve Series). Repeating the process produces double purified splits. Repeating the process again produces triple purified splits. In accordance with the present invention, the use of double purified splits or triple purified splits are particularly preferred.

Other optional materials may be added to the splits during the processing. For example, additives to improve the solubility of the otherwise insoluble material may be provided. One such material is propylene oxide, which may be added in amounts ranging from about 0 to about 100 parts per 100 parts of gum splits. Even more preferred is the addition of between about 0 and about 20 parts of propylene oxide per 100 parts of gum splits. In the case of propylene oxide addition, the amounts added to function as a processing/solubilizing agent are small enough so that the propylene oxide does not react with the polygalactomannan to form a hydroxypropyl derivative but rather is removed during subsequent washing steps. Other solubilizing additives may be alternatively used. Examples of such additives include ethylene oxide and butylene oxide. Any additive which acts as a solubilizing aid and does not react with the guar molecule is considered to be within the scope of the present invetion.As will be discussed later, the addition of higher amounts will lead to the production a hydroxypropyl derivative.

The splits may also include one or more crosslinkers which function to form a viscous gel upon hydration and use of the splits as thickening agents. A particularly preferred crosslinking agent is borax, which is added in an amount ranging from about 0 to about 0.4 parts per 100 parts splits, with amounts ranging from about 0.025 to about 0.16 parts per 100 parts splits being more preferred. Other crosslinking agents such as metal salts, e.g., aluminum, titanium, zirconium salts may alternatively be selected. The specific crosslinking agent selected is not considered critical to the invention.

To obtain the desired final product, the guar, and optional additives is first treated with an aqueous solution of base, preferably an aqueous solution containing greater than 12% of NaOH, and more preferably a 12 to 30% aqueous solution of NaOH. Even more preferred is treatment with between about a 12 to 24% aqueous solution of NaOH and even more preferred is treatment with between about 16 to about 20% of a NaOH aqueous solution. In the preferred embodiment between about 120 to about 138 parts of the aqueous solution are added for every 100 parts of splits. Once added the base solution is completely absorbed by the splits and as a result, no filtration is needed before subsequent processing steps. This base treatment takes place at temperatures ranging from about 40° C. to about 100° C. for a time period of between about 30 minutes to about 6 hours.

After the base treatment, the guar splits are then washed with water, an organic solvent, or a mixture of both. Particularly preferred organic solvents are water miscible solvents including alcohols such as methanol, ethanol, isopropanol, n-propyl alcohol, n-butyl alcohol and the like. Other commonly used purification solvents such as acetone, glycols and the like may alternatively be selected. Of the above solvents, the most preferred is the use of methanol, ethanol, isopropyl alcohol, acetone and mixtures thereof.

In practice it is generally preferred to use mixtures of water and organic solvents in the wash step. Particularly effective results occur when using between about 20 to about 90 percent water by weight and between about 80 to about 10 percent organic solvent by weight. Most preferred is the use of between about 25 to about 50% by weight isopropyl alcohol and between about 75 to about 50% by weight water.

The volume of the wash liquid is much greater than the amount of treated splits and can be performed in batchwise or multiple applications. In preferred practices the volume of the wash liquid is at least twice the volume of the treated splits and preferably at least three times the volume of the splits. In addition, when washing the treated splits, it is preferable to conduct between 4 to 6 independent wash cycles. The concentration of the wash liquid for each cycle can be the same or different. For example washing of the splits may be accomplished by first washing with water alone, followed by washing with solutions of isopropyl alcohol.

After washing, the guar splits are then dried and recovered using means known in the art so that the final moisture content of the splits is less than 30 percent, more preferably less than 15 percent, but preferably more than 10 percent by weight. Examples of such means include air drying, filtering, evaporative drying, centrifuging, flash grinding, addition of solvents, freeze drying and the like. The use of centrifuging is particularly recommended. As discussed below, the dried splits may then be derivatized to produce desired compositions.

Once dried, the solid compositions may be ground to yield particulates having a particle size as desired. Alternatively, the composition may be dried in a splits form for subsequent processing steps. The size of the particulates, preferably granular particles are primarily dictated by the desired final use. Similarly, the shape of the final compositions may be as desired. Alternatively, the product may be dried as a-thin film, laminate, or sheet. Shapes including spherical particles, flakes and the like are clearly contemplated as falling within the scope of the invention. The key selection criteria for the final shape of the particulates is primarily dictated by the intended final use for the polygalactomannan material.

Once the processed polygalactomannan is dried in splits form, but prior to grinding, it can then be derivatized by means known in the art. Derivatized polygalactomannans include one or more non-ionic, anionic or cationic groups. Examples of the types of functional groups involved in producing the derivatives include hydroxyalkyl groups, carboxyalkyl groups, quaternary ammonium groups, sulfonate groups, cyanoalkyl groups, phosphate groups, siloxane groups and the like having varying degrees of substitution and molecular substitution.

The resulting polygalactomannans may be multiple derivatives, such as double and triple derivatives having various degrees of substitution and molar substitution.

Specific examples of preferred derivatized polygalactomannans include hydroxypropyl guar gum; hydroxyethyl guar gum; 2-hydroxypropyl-trimethylammonium halide guar gum (quaternary ammonium cationic guar); 2-hydroxypropyl-dimethylalkylammonium halide guar gum (quaternary ammonium cationic guar, alkyl represents a long chain moiety having between 6 and 24 carbon atoms); 2-hydroxyethyl-dimethylalkylammonium halide guar gum (quaternary ammonium cationic guar, alkyl represents a long chain moiety having between 6 and 24 carbon atoms); carboxyethyl guar gum; carboxymethyl guar gum; carboxymethylhydroxypropyl guar gum; carboxymethylhydroxyethyl guar gum; and the like.

The term "degree of substitution" as employed herein is the average substitution of functional groups per anhydro sugar unit in the polygalactomannan gum. In guar gum, the basic unit of the polymer consists of two mannose units with a glycosidic linkage and a galactose unit attached to the C6 hydroxyl group of one of the mannose units. On the average, each of the anhydro sugar units contains three available hydroxyl sites. A degree of substitution of three would mean that all of the available hydroxyl sites have been esterified with functional groups. A particularly preferred degree of substitution is between about 0.0 and about 3.0, more preferably between about 0.08 to about 0.40. Preferred derivative functional groups are carboxymethyl groups and 2-hydroxypropyltrimethylammonium halide groups.

Similarly, the term "molar substitution" as employed herein is the average number of moles of functional groups per anhydro sugar unit in the polygalactomannan gum. A particularly desired molar substitution is between about 0.0 and about 3.0, more preferably between about 0.08 to about 1.20. Preferred derivative functional groups are the hydroxyethyl and hydroxypropyl groups. In a specific preferred embodiment the resulting polysaccharide is carboxymethyl hydroxypropyl guar having a molar substitution of hydroxypropyl groups of between about 0.25 and about 0.35 and a degree of substitution of carboxymethyl groups of between about 0.10 and about 0.15.

The present invention is also specifically intended to encompass derivatization that occurs prior to the washing and drying steps. For example derivatized polygalactomannans can be produced by adding a derivatizing agent (e.g., propylene oxide) to the starting polygalactomannan splits. The resulting materials are particularly advantageous in that they are capable of achieving very high clarity when added to water in solution form. Prior to the present invention, when added to water in 0.5% solutions, natural or derivatized guar gum was not capable of producing light transmissions of greater than 60% at 500–600 nm, with water being 100%. By using the inventive process, the guar gum produced can have a light transmission (0.5% solution) of greater than about 70%, more preferably greater than about 80%, and most preferably between about 85% and 100%. As will be discussed below, the ability to form clear solutions provides a number of advantages for use in a number of functional applications.

In addition, the resulting materials have extremely low protein contents. While conventional guar gum may have about 0.7–0.8% protein nitrogen content, the inventive gums of the present invention have a content of less than 0.1% nitrogen content. Even more preferred are products having a protein nitrogen content of less than 0.08%.

Further, the inventive materials have low enzymatic hydrolysis residues (EHR). Conventional guar gums have between about 7 to about 10% EHR whereas the inventive non-derivatized guar gum has about 1.0–2.0%. The inventive derivatized guar gum has about 0.5–1.2% EHR.

In addition, the inventive materials form extremely stable aqueous solutions. For example, conventional guar aqueous solutions can decay in 2–3 days after preparation. The inventive products can maintain a constant viscosity for more than 7 days, more preferably more than 10 days, and most preferably more than 14 days at room temperature.

The inventive materials also possess very few bacterial contents. The bacterial counts are much lower than those of food grade specification polygalactomannans.

Because of these above properties, the inventive materials are suitable for a wide range of commercial applications. Included amongst them are in oil and gas recovery, because of the low amount of enzymatic hydrolysis residues, high crosslinking ability, ease of filtration during natural gas recovery and potential synergy with other components such as cross-linking agents; personal care products, because of low protein content, potentially improved skin sensitivity, clear and colorless appearance for consumer appeal, potential compatibility with other surfactants and personal care chemicals such as polyorganosiloxanes and potential flow modification characteristics; textile chemicals because of potential improved jet flow in textile machinery and increased molecular interaction with xanthan gum; dyes; paper chemicals including print and processing chemicals; paints; food products; explosives; absorbent materials; agricultural products; cosmetics; and any other application where the above combination of high clarity with high viscosity would be beneficial.

In addition, when crosslinked with agents such as borax as discussed above, the inventive compositions are able to provide extremely high crosslinked gels.

The invention will be better understood by reference to the following examples.

EXAMPLE 1

2000 parts of double purified guar splits (DPS) are added to 2780 parts of an aqueous 17.6% sodium hydroxide solution. The materials are reacted for 60 minutes at a temperature of about 150° F. under a nitrogen atmosphere. The mixture is washed three times with water, then twice with 30% aqueous isopropyl alcohol (IPA), and ground with a wet-grinder in a 50% IPA aqueous solution. The guar powder is filtered and dried. The solution viscosity of a 1% solution at 25° C. is 5800 cps as measured by a Brookfield Viscometer, Spindle No. 4, 20 rpm, and after heating to 60°–70° C. for 20–30 minutes becomes 7500 cps as measured by a Brookfield Viscometer, Spindle No. 4, 20 rpm. The nitrogen content is 0.06%, and the light transmission of a 0.5% aqueous solution at 500–600 nm is 80–81%.

EXAMPLE 2

The procedure of Example 1 is repeated except the grinding step is omitted. As a result dried splits are produced.

EXAMPLE 3

2500 parts of DPS are added to 3445 parts of a 18% aqueous sodium hydroxide solution containing 1.5 parts borax under a nitrogen atmosphere. The mixture is heated to 150°–160° F. for 10 minutes. 250 parts of propylene oxide are then added over 30 minutes. After the reaction is complete, the reaction product is washed with water 4 times and 3 times with a 50% aqueous IPA solution. A portion of the treated splits are ground to powder, while the remainder are dried in splits form. The solution viscosity of a 1% solution at 25° C. is 6500 cps as measured by a Brookfield Viscometer, Spindle No. 4, 20 rpm, the nitrogen content is 0.04% the light transmission of a 0.5% aqueous solution at 500–600 nm is 79%, and the ash content is 1.4%.

EXAMPLE 4

The procedure of Example 3 is repeated using triple purified guar splits (TPS) instead of double purified splits. The solution viscosity of a 1% solution at 25° C. is 7500 cps as measured by a Brookfield Viscometer, Spindle No. 4, 20 rpm, the nitrogen content is 0.06%, the light transmission of a 0.5% aqueous solution at 500–600 nm is 79%, and the ash content is 0.84%.

EXAMPLE 5

2500 parts of TPS are added to 2450 parts of a 5.1% aqueous sodium hydroxide solution containing 3.0 parts borax. The mixture is heated to 150°–160° F. After 25 minutes, 840 parts of propylene oxide are added. After hydroxypropylation is complete, 990 parts of a 50% aqueous sodium hydroxide solution are added to the reactor and the temperature is maintained at 150°–160° F. for one hour. The product is washed with water 4 times, then twice with a 50% aqueous IPA solution. One half of the product is ground to powder and the other half of the product is dried as splits form. The solution viscosity of a 1% solution at 25° C. is 5600 cps as measured by a Brookfield Viscometer, Spindle No. 4, 20 rpm, the nitrogen content is 0.06%, the light transmission of a 0.5% aqueous solution at 500–600 nm is 88%, and the ash content is 0.38%. The resulting material is believed to be hydroxypropyl guar having a molecular substitution of 0.55.

EXAMPLE 6

240 parts of the composition of Example 2 are mixed with 80 parts of IPA and 100 parts of a 25% aqueous sodium hydroxide solution. The mixture is heated under a nitrogen atmosphere to 120° F. 221 parts of a 38% solution of a cationic reagent, 1-chloro-2-hydroxypropyltrimethylammonium chloride (QUAB-188, sold by The Degussa Company) are added and the temperature is maintained at 140°–145° F. for 2 hours. The product is washed 3 times with a 30–40% aqueous IPA solution and then ground to powder. The solution viscosity of a 1% solution at 25° C. is 1600 cps as measured by a Brookfield Viscometer, Spindle No. 3, 20 rpm, the nitrogen content is 1%, and the light transmission of a 0.5% aqueous solution at 500–600 nm is 93%. The resulting material is believed to be 2-hydroxypropyltrimethylammonium chloride guar (cationic) having a degree of substitution of 0.23.

EXAMPLE 7

1175 parts of the splits obtained from Example 3 are added to 500 parts of a 40% aqueous sodium monochloroacetic acid solution. After 15 minutes, 436 parts of a 22% aqueous sodium hydroxide solution are added and the mixture is heated to 140° F. and held at that temperature for 1 hour. The product is twice washed with water and then ground to powder. The solution viscosity of a 1% solution at 25° C. is 3300 cps as measured by a Brookfield Viscometer, Spindle No. 3, 20 rpm, the nitrogen content is 0.03%, and the light transmission of a 0.5% aqueous solution at 500–600 nm is 93.5%. The resulting material is believed to be carboxymethyl guar having a degree of substitution of 0.12.

EXAMPLE 8

1464 parts of the splits obtained from Example 5 are added to 571 parts of a 15% aqueous sodium hydroxide solution. 25 minutes after the splits addition, 800 parts of a 32.5% QUAB-188 solution are added to the reactor and the temperature is maintained at 140°–145° F. for 1 hour. The reaction product is washed with water 3 times and ground to a powder. The solution viscosity of a 1% solution at 25° C. is 550 cps as measured by a Brookfield Viscometer, Spindle No. 2, 20 rpm, the nitrogen content is 0.92%, the light transmission of a 0.5% aqueous solution at 500–600 nm is 96% and the ash content is 0.7%. The resulting material is believed to be 2-hydroxypropyltrimethylammonium chloridehydroxypropyl guar having a molecular substitution of 0.55 and a degree of substitution of 0.12.

Having described the invention in detail and by reference to the preferred embodiments thereof, it will be apparent that modifications and variations are possible without departing from the scope of the appended claims.

What is claimed is:

1. A process for producing a polygalactomannan comprising the steps of:
   (a) treating polygalactomannan splits with a 12 to 30 weight percent solution of an aqueous base solution;
   (b) washing said base treated splits one or more times with water, an organic solvent or mixtures thereof; and (c) recovering the product produced thereby;
where in step (a) about 120 to about 140 parts of aqueous base solution are added for every 100 parts of polygalactomannan splits.

2. The process according to claim 1 wherein said polygalactomannan comprises guar gum.

3. The process according to claim 2 wherein said splits are double purified or triple purified guar gum splits.

4. The process according to claim 2 wherein said aqueous base solution is an aqueous NaOH solution.

5. The process according to claim 4 wherein the concentration of said aqueous NaOH solution is between about 16 and about 20% by weight.

6. The process according to claim 1 wherein the wash solvent of step (b) is an aqueous solution of isopropyl alcohol, methanol, ethanol or acetone.

7. The process according to claim 5 wherein between about 120 to about 140 parts of said aqueous NaOH solution are used per 100 parts of polygalactomannan splits.

8. Guar gum which demonstrates greater than 75% light transmission at a wavelength of from about 500–600 nanometers when dispersed in water in the amount of 0.5 parts per 100 parts water produced by the following process:

(a) treating guar gum splits with a 12 to 30 weight percent solution of an aqueous base solution;

(b) washing said base treated splits one or more times with water, an organic solvent or mixtures thereof; and (c) recovering the product produced thereby:
wherein in step (a) about 120 to about 140 parts of aqueous base solution are added for every 100 parts of polygalactomannan splits.

9. The guar gum according to claim 8 which demonstrates greater than 80% light transmission at a wavelength of from about 500–600 nanometers when dispersed in water in an amount of 0.5 parts per 100 parts water.

10. The guar gum according to claim 9 which demonstrates between about 85% and about 100% light transmission at a wavelength of from about 500–600 nanometers when dispersed in water in an amount of 0.5 parts per 100 parts water.

11. The guar gum according to claim 8 having a nitrogen content of less than 0.08%.

12. The guar gum according to claim 8 which demonstrates a constant solution viscosity for greater than seven days.

13. An oil field chemical, personal care chemical, cosmetic, textile chemical, dye, absorbent material, food product, explosive, agricultural product, paper chemical or coating composition including guar gum which demonstrates greater than 75% light transmission at a wavelength of from about 500–600 nanometers when dispersed in water in an amount of 0.5 parts per 100 parts water produced by the following process:

(a) treating guar gum splits with a 12 to 30 weight percent solution of an aqueous base solution;

(b) washing said base treated splits one or more times with water, an organic solvent or mixtures thereof; and (c) recovering the product produced thereby;
wherein in step (a) about 120 to about 140 parts of aqueous base solution are added for every 100 parts of polygalactomannan splits.

* * * * *